US008528225B2

(12) United States Patent
Weisselberg

(10) Patent No.: US 8,528,225 B2
(45) Date of Patent: Sep. 10, 2013

(54) APPARATUS AND METHOD FOR CONTINUOUS LYOPHILIZATION

(75) Inventor: Edward Weisselberg, Kinnelon, NJ (US)

(73) Assignee: Wyssmont Company Inc., Fort Lee, NJ (US)

( * ) Notice: Subject to any disclaimer, the term of this patent is extended or adjusted under 35 U.S.C. 154(b) by 377 days.

(21) Appl. No.: 12/950,336

(22) Filed: Nov. 19, 2010

(65) Prior Publication Data

US 2011/0138646 A1    Jun. 16, 2011

Related U.S. Application Data

(60) Provisional application No. 61/355,282, filed on Jun. 16, 2010, provisional application No. 61/284,068, filed on Dec. 11, 2009.

(51) Int. Cl.
*F26B 5/06* (2006.01)

(52) U.S. Cl.
USPC .............. 34/284; 34/287; 34/92; 414/222.01; 414/806; 201/27; 201/38; 208/390; 208/408; 202/109; 202/118

(58) Field of Classification Search
USPC .................... 34/222.01, 806; 414/27, 38, 90; 201/27, 38, 90; 208/390, 400, 407, 408; 202/109, 117, 118
See application file for complete search history.

(56) References Cited

U.S. PATENT DOCUMENTS

| 3,088,222 A | * | 5/1963 | Mace et al. ................. 34/92 |
| 3,199,217 A | | 8/1965 | Oldenkamp et al. |
| 3,218,727 A | | 11/1965 | Lind |
| 3,281,949 A | * | 11/1966 | Tyson ......................... 34/292 |
| 3,376,652 A | * | 4/1968 | Hernandez, Jr. .............. 34/292 |
| 3,448,556 A | | 6/1969 | Taggart |
| 3,462,849 A | | 8/1969 | Gidlow |
| 3,484,946 A | | 12/1969 | Sauer |
| 3,731,392 A | | 5/1973 | Gottfried |
| 3,777,409 A | | 12/1973 | Weisselberg et al. |
| 4,016,657 A | * | 4/1977 | Passey ........................... 34/92 |

(Continued)

FOREIGN PATENT DOCUMENTS

| DE | 102007032536 A1 | * | 1/2009 |
| EP | 913656 A1 | * | 5/1999 |

(Continued)

OTHER PUBLICATIONS

Wyssmont—Turbo-Dryer, excerpts from Turbo-Dryer video at 3 min 30 sec, 3 min 50 sec and 3 min 54 sec.

(Continued)

*Primary Examiner* — Steve M Gravini
(74) *Attorney, Agent, or Firm* — Lerner, David, Littenberg, Krumholz & Mentlik, LLP

(57) ABSTRACT

A method and apparatus for the continuous sublimation of a substance includes cascading a material containing a substance capable of sublimation, such as water, between a plurality of trays vertically stacked within a processing zone provided within a processing chamber. A substantially atmospheric environment is maintained within the processing zone at a temperature whereby the substance sublimes forming a sublimate within the environment. The environment containing the sublimate is contacted with a drying agent such as a desiccant to maintain the environment whereby the substance sublimes at substantially atmospheric pressure and at the controlled temperature.

9 Claims, 2 Drawing Sheets

(56) References Cited

U.S. PATENT DOCUMENTS

| | | | |
|---|---|---|---|
| 4,081,914 A * | 4/1978 | Rautenbach et al. | 34/92 |
| 4,104,807 A | 8/1978 | Braun | |
| 4,561,191 A | 12/1985 | Parkinson | |
| 4,949,473 A * | 8/1990 | Steinkamp | 34/92 |
| 5,035,065 A | 7/1991 | Parkinson | |
| 5,263,267 A * | 11/1993 | Buttner et al. | 34/519 |
| 5,269,077 A | 12/1993 | Bruttini | |
| 5,852,880 A | 12/1998 | Harrison | |
| 6,233,841 B1 * | 5/2001 | Beach | 34/262 |
| 7,089,681 B2 * | 8/2006 | Herbert et al. | 34/92 |
| 7,765,713 B2 * | 8/2010 | Ehrhard et al. | 34/89 |
| 2011/0094940 A1 * | 4/2011 | Weisselberg | 208/390 |
| 2011/0138646 A1 * | 6/2011 | Weisselberg | 34/284 |
| 2012/0073157 A1 * | 3/2012 | Weisselberg et al. | 34/77 |
| 2012/0073159 A1 * | 3/2012 | Weisselberg et al. | 34/468 |

FOREIGN PATENT DOCUMENTS

| | | | |
|---|---|---|---|
| JP | 2006064190 A * | 3/2006 | |
| JP | 2012074564 A * | 4/2012 | |
| WO | WO 3091645 A1 * | 11/2003 | |

OTHER PUBLICATIONS

U.S. Appl. No. 11/975,144.
U.S. Appl. No. 12/456,427.
U.S. Appl. No. 12/589,394.
International Search Report and Written Opinion, PCT/US2010/0574404, Dated Jan. 28, 2011.

* cited by examiner

APPARATUS AND METHOD FOR CONTINUOUS LYOPHILIZATION

CROSS-REFERENCE TO RELATED APPLICATIONS

This application claims the benefit of the filing dates of the U.S. Provisional Patent Application No. 61/284,068, filed Dec. 11, 2009, entitled "Apparatus And Method For Continuous Lyophilization," the disclosure of which is hereby incorporated herein by reference, and the U.S. Provisional Patent Application No. 61/355,282, filed Jun. 16, 2010, entitled "Apparatus And Method For Continuous Lyophilization," the disclosure of which is hereby incorporated herein by reference.

BACKGROUND OF THE INVENTION

The present invention relates in general to an apparatus and method for the continuous lyophilization, also known as freeze-drying, of a material by sublimation under substantially atmospheric pressure.

Lyophilization is a dehydration process typically used to preserve a perishable material or make the material more convenient for transport. A common application for the lyophilization of perishable material include pharmaceuticals and food products. Lyophilization overcomes two of the common problems associated with conventional drying of material by evaporation. The first problem is the inherent difficulty of removing water completely using evaporation because most of the water is not directly exposed to the air. Second, the liquid water involved in the evaporation process significantly changes the shape, texture and composition of the material. This is a particular disadvantage in the process of drying material that it intended to be revitalized later.

The fundamental principle in lyophilization is sublimation which is an endothermic phase transition that occurs at temperatures and pressure below the triple point. At normal pressures, most chemical compounds and elements possess three different states at different temperatures. In these cases, the transition from the solid to the gaseous state requires an intermediate liquid state. As shown in the phase diagram of FIG. 1, the boundary between gas and liquid runs from the triple point 10 to the critical point 20. Freeze drying (arrow 30) brings the system around the triple point, avoiding the direct liquid to gas transition seen in ordinary drying (arrow 40). Sublimation occurs when the partial pressure of the compound or element in the surrounding atmosphere is less than the vapor pressure of the compound or element in the material being lyophilized. Various apparatus and methods for lyophilization of material are known from U.S. Pat. Nos. 5,269,077; 4,561,191; 4,104,807; 3,731,392; 3,484,946; and 3,462,849, the disclosures of which are incorporated herein by reference and copies enclosed herewith.

SUMMARY OF TEE INVENTION

The present invention describes a method for the continuous sublimation of a substance, the method comprising cascading a material containing a substance capable of sublimation between a plurality of trays vertically stacked within a processing zone provided within a processing chamber, maintaining a substantially atmospheric environment within the processing zone at a temperature whereby the substance sublimes forming a sublimate within the environment, and contacting the environment containing the sublimate with a drying agent to maintain the environment whereby the substance sublimes at substantially atmospheric pressure and at the controlled temperature.

The present invention further describes a method for the continuous sublimation of a substance, the method comprising, transferring material containing a substance capable of sublimation through a plurality of processing zones each having a material support arranged in a vertical stack with a processing chamber, controlling an environment within the processing chamber at substantially atmospheric pressure and at a temperature whereby the substance sublimes to form a sublimate within the environment, and contacting the environment containing the sublimate with a drying agent to control the partial pressure of the substance within the environment whereby the substance sublimes at the substantially atmospheric pressure at the temperature.

The present invention further describes a method for the continuous sublimation of a substance, the method comprising, supplying material in particulate form containing a substance in a frozen state, the substance capable of sublimation, cascading the material downwardly between a plurality of trays vertically stacked within a processing chamber maintained under substantially atmospheric pressure, controlling the temperature of the environment within the processing chamber below 32° F. whereby the substance sublimes, controlling the partial pressure of the substance within the environment within the process chamber less than the vapor pressure of the substance in the material at least by contacting the environment with a desiccant or a gas having a low dew point, whereby the substance continuously sublimes within the processing chamber.

The present invention further describes a method for continuous lyophilization by sublimation of a substance, the method comprising freezing a material containing a substance capable of sublimation, providing the frozen material in particulate form to a processing chamber, cascading the frozen material downwardly within the processing chamber between a plurality of rotating trays vertically stacked within the processing chamber, each of the trays forming a processing zone, maintaining a substantially atmospheric environment within each of the processing zones and at a temperature less than 32° F. whereby the substance sublimes forming a sublimate within the environment, and controlling the partial pressure of the substance within the environment at each of the processing zones less than the vapor pressure of the substance in the frozen material.

The method further includes, wherein the environment is maintained whereby the partial pressure of the substance in the processing zone is less than the vapor pressure of the substance in the material.

The method further includes, wherein the temperature of the environment is in the range of about 20-30° F.

The method further includes, wherein the drying agent is a desiccant is selected from the group consisting of lithium chloride, calcium chloride, calcium sulfate, phosphorous pentoxide, triethylene glycol, diethylene glycol, ethylene glycol, tetrathylene glycol, silica gel, and molecular sieves, as well as other desiccants.

The method further includes, supplying the material to the processing chamber in particulate form.

The method further includes, wherein the material is supplied at a temperature of less than 32° F. whereby the substance is frozen.

The method further includes, recovering the sublimate from the desiccant.

The method further includes, recovering the sublimate from the environment by condensing.

The method further includes, wherein the substance comprises water.

The method further includes, circulating the environment within the processing chamber by a plurality of fans within the processing chamber.

The method further includes, wherein the pressure in the processing chamber is maintained between about ±0.10 inches water.

The present invention further describes a method for continuous lyophilization by sublimation of water in a solid phase within a material, the method comprising freezing a material containing water to a temperature below 32° F., whereby the water is present in a solid phase, providing the frozen material in particulate form in the range of about 8-200 mesh to a processing chamber, cascading the frozen material in particulate form downwardly within the processing chamber between a plurality of rotating trays vertically stacked within the processing chamber, each of the trays forming a processing zone, maintaining a substantially atmospheric environment in the range of about ±0.10 inches water within each of the processing zones and at a temperature in the range of about 20°-30° F. whereby the water in a solid phase sublimes forming a sublimate within the environment, controlling the partial pressure of the water within the environment at each of the processing zones less than the vapor pressure of the water in solid phase in the frozen material by at least contacting the environment with a desiccant, heating the environment after contacting the environment with the desiccant, and recycling the heated environment to the processing chamber.

The present invention further describes an apparatus for continuous sublimation of a substance, the apparatus comprising a processing chamber containing a substantially atmospheric environment, the processing chamber having a plurality of trays vertically stacked therein for cascading therethrough a material containing a substance capable of sublimation to form a sublimate at a predetermined temperature, and a desiccant in fluid communication with the processing chamber for maintaining the partial pressure of the substance within the environment within the processing chamber less than the vapor pressure of the substance.

The apparatus further includes, wherein the trays are rotatable.

The apparatus further includes, wherein the desiccant is selected from the group consisting of lithium chloride, calcium chloride, calcium sulfate, phosphorous pentoxide, triethylene glycol, diethylene glycol, ethylene glycol, tetrathylene glycol, silica gel, and molecular sieves.

The apparatus further includes a plurality of fans within the processing chamber for circulating the environment therein.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 1:
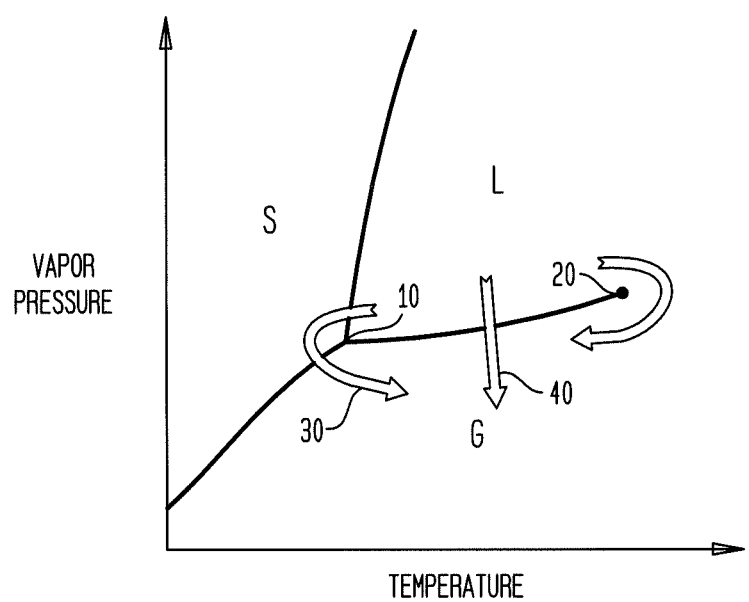
FIG. 1 is a phase diagram.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

FIG. 1 shows an example of an apparatus 100 for the continuous sublimation of a substance such as water in a lyophilization process in accordance with one embodiment of the present invention. As shown, a hollow processing chamber 102 forming the sublimation chamber is cylindrically or polygonally enclosed by sidewall 104 which extends around the circumference of the chamber, a top plate 106, and a bottom plate 108. The chamber has a plurality of internal processing zones which are contiguous with each other thereby forming essentially a single continuous processing chamber where sublimation of a substance to form a sublimate takes place simultaneously or serially within the chamber at substantially atmospheric conditions. The chamber 102 is preferably maintained at atmospheric pressure, however, a slight pressure of about ±0.10 inches water, and more preferably, about ±0.05 inches water is also contemplated.

The apparatus 100 can operate continuously by continuously supplying material to be processed through a feed port 112 such as in the top plate 106 and removing continuously the exhaust gas which includes the sublimate from a vapor outlet 114 such as also in the top plate or sidewall 104. The lyophilized material, referred to as freeze dried product, may be removed from the apparatus 100 through a product discharge port 116 such as in the bottom plate 108. The various processing zones typically operate at substantially the same atmospheric pressure and substantially the same temperature, or one zone may operate at a higher or lower temperature relative to other zones if desired.

The processing zones within the chamber 102 may be heated using recycled heated air or inert gas such as nitrogen from heater 118 and intake fan 120 supplied to the chamber through gas inlet 121. The heated gas may also be supplied to multiple levels within the chamber 102 as shown by heated gas inlets 121, 122, 125 connected to the heater 118. Separate heaters for each of the gas inlets may also be provided to provide different temperatures. Accordingly, the supplied heated gas may be at the same or different temperatures for one or more of the processing zones. Generally, it is contemplated that heated air will be the heating medium for the sublimation process. However, heated nitrogen is the preferred heating medium when oxidation within the processing chamber 102 is a concern, other inert gases may also be used. In addition, electric or gas fire heaters may be used to heat gases as may be desired.

The apparatus 100 includes any of a variety of components for transferring the material through the different zones of the processing chamber 102. For example, the apparatus may incorporate a plurality of vertically displaced material supports such as trays 130. According to one embodiment, the trays may include apertures (not shown), thereby allowing material to pass through or cascade downwardly from one tray to a lower tray through the processing chamber 102. For example, the trays 130 may be attached to a rotating structure 132, and thus may rotate about a substantially vertical axis as the structure rotates. A cantilevered device 134 can be provided extending over each of the trays to push material through the aperture as the trays rotate. The cantilevered devices 134 may be constructed as wiper arms to transfer the material from one tray level to the next tray level below, or gyrating trays with large perforations may be used to shake the material from one tray level down to the next tray.

The apparatus 140 further includes at least one drive assembly 136 underlying the structure 132 which powers operations within the chamber 102. The plurality of spaced apart stacked trays 130 are rotated by the drive assembly 136. Alternatively, the trays 130 may remain stationary, and the cantilevered devices 134 may sweep across the trays to transition the material thereon from one tray to the next. Accordingly, the material being processed is transferred from the feed port 112 onto the first tray level, and continuously through the processing chamber 102 via the tray levels to the product discharge port 116.

Inside the chamber 102, the apparatus incorporates the vertical set of trays 130 surrounding a centrally arranged set of vertically-aligned fans 140 connected to a rotatable fan shaft 142 coupled to the drive assembly 136. The fans 140 may be connected to the fan shaft 142 by keys 144. The fans circulate the heated air or gases inside the chamber over the material in each of the trays 130 to provide a uniform temperature distribution as the material is progressively transferred to lower tray levels. Each tray is connected to at least one stanchion 146, wherein several stanchions are positioned around the fan shaft 142, thereby forming the rotating structure 132 in the nature of a squirrel cage. According to this embodiment, the trays 130 are arranged as a rotating tray structure which surrounds the fan shaft 142. Drive gears (not shown) cause the structure 132 to rotate, thereby causing the trays 130 to revolve within the chamber 102.

The cantilevered devices 134 which form tray wipers may be positioned above each tray 130, although not shown for each tray. As each tray rotates, the tray wiper transfers the supported material downwardly to the next tray level. A rigidly mounted leveler 150 may also brush across the top surface of the material placed within a tray, thereby leveling the material and exposing material underneath the top portion to the environment within the chamber. Material that is spilled by the tray wiper over the side of the tray (i.e., between the chamber sidewall 102 and the rotating trays) falls onto catch plate 152. The catch plate, angularly positioned with respect to the trays 130, causes the material which is spilled off a tray above to fall into a tray below. In this manner, the material being processed cascades downwardly from the upper tray to the lower tray through the apertures or by the catch plate. According to one aspect, a turntable sweeper 148 may be positioned within the bottom of the processing chamber 102. The turntable sweeper may prevent complications potentially caused by material falling onto the processing chamber bottom.

As the processed material is being rotated and moved as described above between the trays, further heating elements may be implemented within the chamber 102. The several fans 140 within the chamber facilitate circulation of the heated gas to effect a more even temperature profile in each zone within the chamber by pushing the internal environment within the chamber across each of the trays 130. The trays 130 and fans 140 are driven by the drive assembly 136.

Alternatively or additionally, internal heating within the chamber may be used. For example, electrical heaters 170 may be placed within the chamber 102 at selected locations to heat the internal gas. In other units, U-tubes (i.e., hollow tubes with flames inside) may be positioned within the chamber and connected to an exhaust and a natural gas inlet port. To prevent the heated gas within the chamber 102 from escaping, seal assemblies may be placed around the shaft 142 and near the opening in the top plate 106 and bottom plate 108.

According to one aspect, continuous sublimation may be performed in a commercial TurboDryer® system as modified pursuant to the present invention. However, other systems which may be used include any type of a vertical apparatus with trays or plates or hearths that retain the material and in which the material moves down through the apparatus by means of arms, blades, or other such devices. Certain aspects of the construction of the apparatus described is disclosed and described in co-pending application Ser. No. 11/975,144, filed on Oct. 17, 2007, in co-pending application Ser. No. 12/456,427, filed on Jun. 15, 2009, and in co-pending application Ser. No. 12/589,394, filed Oct. 22, 2009, entitled "Method for the Pyrolytic Extraction of Hyrocarbon From Oil Shale", the disclosures of which are incorporated herein by reference.

The sublimate and exhaust gas from the vapor outlet 114 are optionally passed through a cooling device 124. The exhaust gas may be cooled if desired with water, air, or other fluid medium. Optionally, the exhaust gas may pass through a particulate filter 125 which may be arranged before or after the cooling device 124.

In order to promote sublimation in the processing chamber, the partial pressure of the substance to be sublimed should be maintained less than the vapor pressure of the substance in the material being lyophilized when frozen. By way of one example, this can be accomplished by passing the exhaust gas from the processing chamber 102 through a desiccant system 128 to control the dew point before recycling the exhaust gas back to the processing chamber through the heater 118. Another way of reducing the partial pressure of the substance to be sublimed in the processing chamber 102 is to introduce extremely dry gas such as extremely low dew point air or liquid nitrogen into the chamber.

The desiccant used in the desiccant system 128 may be either a solid desiccant or a liquid desiccant. In the case of a solid desiccant, contact with the exhaust gas may be accomplished in any suitable means known to those skilled in the art, for example, a fluidized bed and drying tubes containing particulate desiccant and the like. As the exhaust vapors pass over the desiccant, moisture within the exhaust gas is picked up by the desiccant thereby lowering the partial pressure of the water in the exhaust gas below its vapor pressure. Once the desiccant has been spent, i.e., typically saturated with moisture, the desiccant can be rejuvenated. In this regard, the spent desiccant can be heated to a temperature sufficient to evaporate the absorbed water whereby the desiccant can be reused. The recovered sublimate can be recycled for use in the initial freeze drying process.

In a continuous sublimation process, it is contemplated that a plurality of desiccant systems 128 will be arranged in parallel with the exhaust gas discharged from the processing chamber 102. When one or more of the desiccant systems becomes spent, it may be taken out of line while the desiccant is being rejuvenated. The exhaust gas may therefore be supplied to a plurality of desiccant systems 128 using a manifold 172 controlled by suitable valves to isolate individual desiccant systems as may be desired during the lyophilization and desiccant regeneration processes.

In a similar manner, it is contemplated that the desiccant system 128 can incorporate a liquid desiccant. Any number of known systems for contacting the exhaust gas with a liquid desiccant can be used, for example, a column where the liquid desiccant is fed to the top of the column where it is contacted with the exhaust gas from the processing chamber. The liquid desiccant removes the moisture and is carried out the bottom of the column. The dry exhaust gas leaves the top of the column where it can be recycled back to the processing chamber 102 through the intake fan 120 and heater 118. The liquid desiccant after leaving the column can be fed to a heat exchanger for regenerating the desiccant by removing the excess moisture. The regenerated desiccant can be recycled back to the absorber column in a continuous cycle. Any variety of liquid or solid desiccants can be used in accordance with the present invention. For example, known desiccants include lithium chloride, calcium chloride, calcium sulfate, phosphorous pentoxide, triethylene glycol, diethylene glycol, ethylene glycol, tetrathylene glycol, silica gel, and molecular sieves.

The apparatus and method of the present invention has particular application in the lyophilization, i.e., freeze drying of various materials which contain water. These materials can encompass a broad product line of food products and pharmaceutical compositions for preserving the product as well as for reducing weight. It is to be understood that the apparatus and method of the present invention is suitable for use with any material containing a substance which is capable of sublimation.

Figure 2:
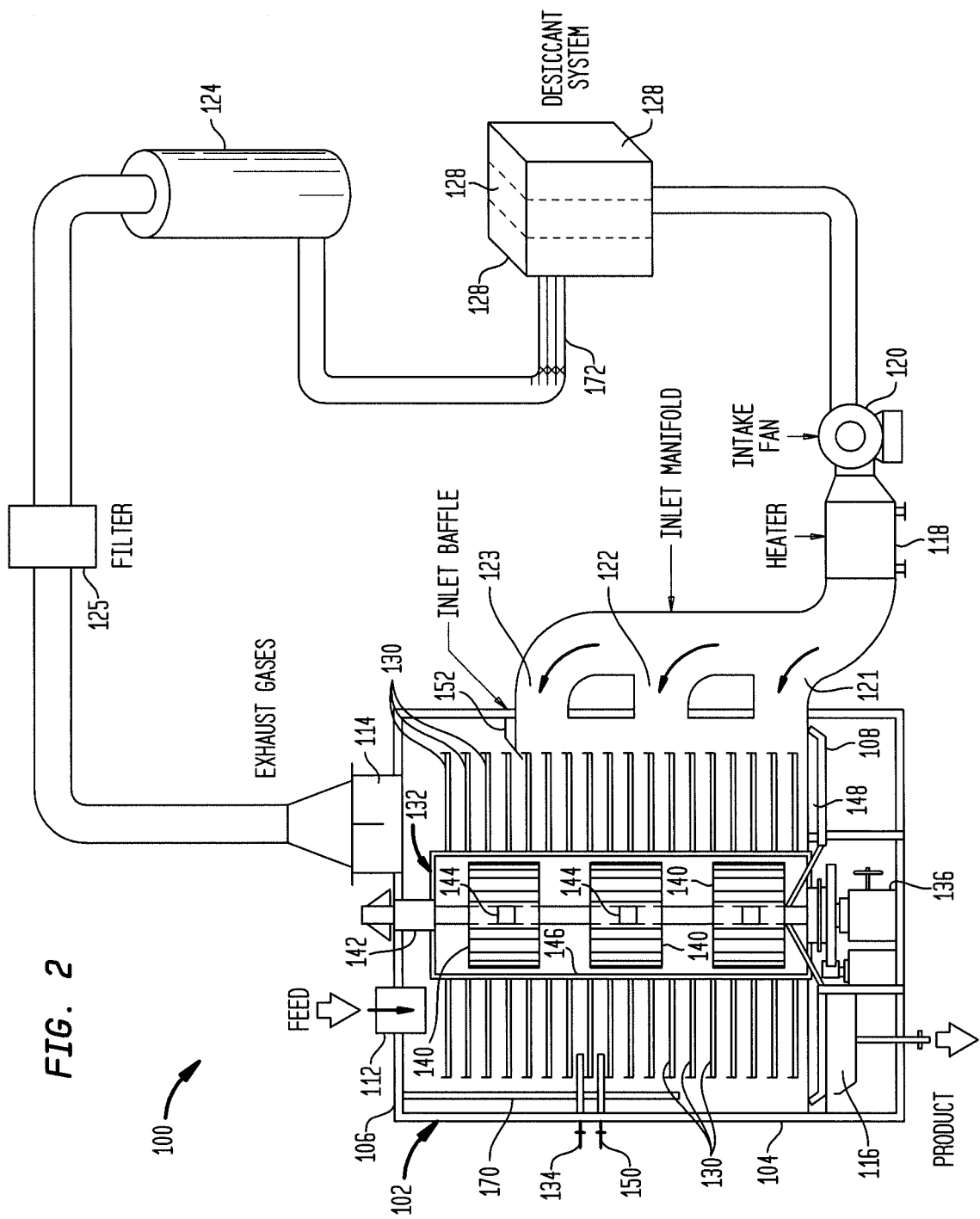
FIG. 2 is a diagrammatic front perspective view of an apparatus for the continuous sublimation of a substance in accordance with one embodiment of the present invention.

In accordance with one embodiment of the present invention, a food product containing water is freeze dried using the apparatus and method as described with respect to FIG. 2. The food product is initially prepared with a water content, either naturally or artificially. The food product is frozen by any suitable means to a temperature below 32° F. The frozen food product is reduced to particulate form in the range of about 8 to 200 mesh using any suitable grinding equipment. The particulate frozen food material is fed continuously to the processing chamber 102 onto the top tray 130 of the rotating trays via feed port 112. The food product on each tray 130 rotates most of the way around the interior of the processing chamber at each processing zone.

As each tray 130 rotates, the tray wiper 134 transfers the material to the next underlying tray. The material that is spilled by the tray wiper may fall onto the catch plate 152 or other suitable device. The catch plate, angularly positioned with respect to the trays 130, passes the material which is spilled off the tray above to fall onto a tray below. In this manner, the food product being processed cascades downwardly through the processing chamber 102 from the top most tray to the bottom most tray.

As the food product continues down through the processing chamber 102, it is subject to an environment at substantially atmospheric pressure, and at a temperature which sublimation of the water in solid phase occurs, e.g., in the range of about 20°-30° F. The sublimation process continues by controlling the environment within the processing chamber such that the partial pressure of the water in the chamber is less than the vapor pressure of the frozen water in the food material being processed. As explained hereinabove, this is achieved by passing the exhaust gas through the desiccant system 128. The freeze dried material is discharged from the processing chamber 112 via discharge port 116.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for the continuous sublimation of a substance, the method comprising:
cascading a material containing a substance capable of sublimation between a plurality of trays vertically stacked within a processing zone provided within a processing chamber;
maintaining a substantially atmospheric environment within the processing zone and at a temperature whereby the substance sublimes forming a sublimate within the environment;
recovering the sublimate from the environment; and
contacting the environment after recovering the sublimate therefrom with a drying agent to maintain the environment whereby the substance sublimes at substantially atmospheric pressure at the temperature.

2. The method of claim 1, further including maintaining the environment whereby the partial pressure of the substance in the processing zone is less than the vapor pressure of the substance in the material.

3. The method of claim 2, further including maintaining the temperature in the range of about 20-30° F.

4. The method of claim 1, wherein the drying agent comprises a desiccant.

5. The method of claim 4, wherein the desiccant is selected from the group consisting of lithium chloride, calcium chloride, calcium sulfate, phosphorous pentoxide, triethylene glycol, diethylene glycol, ethylene glycol, tetrathylene glycol, silica gel, and molecular sieves.

6. The method of claim 1, wherein the drying agent comprises a gas having a dew point whereby the substance sublimes at substantially atmospheric pressure at the temperature.

7. The method of claim 1, further including supplying the material to the processing chamber in particulate form.

8. The method of claim 7, further including supplying the material at a temperature of less than 32° F. whereby the substance is frozen.

9. The method of claim 1, further including recovering the sublimate from the drying agent.

* * * * *